United States Patent [19]

Hazan et al.

[11] Patent Number: 5,250,605
[45] Date of Patent: * Oct. 5, 1993

[54] COATING COMPOSITIONS COMPRISING AN ORGANOSILANE POLYMER AND REACTIVE DISPERSED POLYMERS

[75] Inventors: Isidor Hazan, Clementon; Mitzie K. Rummel, Mt. Laurel, both of N.J.

[73] Assignee: E. I. Du Pont de Nemours and Company, Wilmington, Del.

[*] Notice: The portion of the term of this patent subsequent to Sep. 14, 2010 has been disclaimed.

[21] Appl. No.: 852,456

[22] Filed: Mar. 16, 1992

Related U.S. Application Data

[63] Continuation-in-part of Ser. No. 627,999, Dec. 17, 1990, abandoned.

[51] Int. Cl.⁵ .......................... C08J 3/00; C08K 5/00; C08L 51/00; C08G 63/48
[52] U.S. Cl. .................................... 524/504; 524/521; 525/63; 525/64; 525/69; 525/100; 525/101
[58] Field of Search .................. 524/504, 521; 525/63, 525/64, 69, 100, 101

[56] References Cited

U.S. PATENT DOCUMENTS

| | | | |
|---|---|---|---|
| 4,025,474 | 5/1977 | Porter, Jr. et al. | 260/22 |
| 4,055,607 | 10/1977 | Sullivan et al. | 260/851 |
| 4,075,141 | 2/1978 | Porter, Jr. et al. | 260/17.2 |
| 4,115,472 | 9/1978 | Porter, Jr. et al. | 260/836 |
| 4,147,688 | 4/1979 | Makhlouf et al. | 260/33.6 |
| 4,180,489 | 12/1979 | Andrew et al. | 428/402 |
| 4,220,679 | 9/1980 | Backhouse | 427/401 |
| 4,242,384 | 12/1980 | Adrew et al. | 427/421 |
| 4,268,547 | 5/1981 | Backhouse | 427/385.5 |
| 4,290,932 | 9/1981 | Wright et al. | 260/29.6 |
| 4,415,681 | 11/1983 | Horvath | 523/334 |
| 4,491,650 | 1/1985 | Rizk et al. | 525/102 |
| 4,499,150 | 2/1985 | Dowbenko et al. | 428/447 |
| 4,518,726 | 5/1985 | Kato et al. | 524/32 |
| 4,591,533 | 5/1986 | Antonelli et al. | 428/520 |
| 4,603,064 | 7/1986 | Kania | 427/407 |
| 4,810,756 | 3/1989 | Spinelli | 525/293 |
| 4,908,397 | 3/1990 | Barsotti et al. | 523/400 |
| 4,972,027 | 11/1990 | Isozaki et al. | 525/365 |
| 5,003,004 | 3/1991 | Simms | 525/68 |
| 5,010,140 | 4/1991 | Antonelli et al. | 525/269 |
| 5,063,114 | 11/1991 | Nambu et al. | 428/447 |

FOREIGN PATENT DOCUMENTS

| | | |
|---|---|---|
| 55-8028 | 3/1980 | Japan . |
| 3-00559 | 8/1991 | Japan . |
| 2192399 | 1/1988 | United Kingdom . |

*Primary Examiner*—Paul R. Michl
*Assistant Examiner*—P. Niland
*Attorney, Agent, or Firm*—Chris P. Konkol

[57] ABSTRACT

A coating composition containing a film-forming organosilane polymer and a sterically dispersed macromolecular polymer having macromonomer chains which react with the silane functionality of the organosilane polymer. The coating compositon can be used as the clearcoat over a conventional pigmented basecoat, or as a basecoat or monocoat or primer when a suitable amount of pigment is incorporated therein. The coating composition provides improved chemical resistance and is not prone to cracking.

26 Claims, No Drawings

COATING COMPOSITIONS COMPRISING AN ORGANOSILANE POLYMER AND REACTIVE DISPERSED POLYMERS

CROSS REFERENCE TO RELATED APPLICATION

This application is a continuation-in-part of Ser. No. 07/627,999, filed Dec. 17, 1990 abandoned.

BACKGROUND OF THE INVENTION

This invention is directed to a coating composition useful for providing a finish on a variety of substrates. In particular, this invention is directed to an organosilane composition which may be used for finishing automobiles and trucks.

It is well known that consumers prefer automobiles and trucks with an exterior finish having an attractive aesthetic appearance, including high gloss and excellent DOI (distinctness of image). While ever more aesthetically attractive finishes have been obtained, deterioration of the finish over time, whereby the exterior finish of an automobile or truck loses its luster or other aspects of its aesthetic appearance, may be all the more noticeable. An increasingly observed cause of this deterioration is etching of the finish caused by exposure to environmental chemical attack. Chemicals that may cause etching of a finish include pollutants such as acid rain and chemical smog.

In order to protect and preserve the aesthetic qualities of the finish on a vehicle, it is generally known to provide a clear (unpigmented) topcoat over a colored (pigmented) basecoat, so that the basecoat remains unaffected even on prolonged exposure to the environment or weathering. It is also generally known that alkoxysilane polymers, due to strong silane bonding when cured, exhibit excellent chemical resistance. Exemplary of prior art patents disclosing silane polymers for coating are U.S. Pat. No. 4,368,297; U.S. Pat. No. 4 518 726; U.S. Pat. No. 4,043,953; and Japanese Kokai 57-12058.

However, to applicants' knowledge, none of the previously disclosed alkoxysilane compositions for finishing automobiles or trucks have ever been placed into commercial use. It is believed that heretofore known or patented alkoxysilane coatings may suffer from certain unsolved problems or deficiencies. In particular, alkoxysilane coatings may exhibit a strong tendency to cracking. Such cracking may result from either stress or degradation by ultraviolet radiation. Such cracking would seriously and adversely affect long term durability and weatherability.

There is a need for a commercially practical clearcoat finish having excellent appearance, including high gloss and DOI, that is also resistant to etching caused by chemical attack. To be commercially practical, such a clearcoat must not be prone to cracking. It is also desirable that such a clearcoat should be capable of being applied over a variety of basecoats and have excellent adhesion.

SUMMARY OF THE INVENTION

The invention is directed to a coating composition useful for finishing the exterior of automobiles and trucks and other substrates. The composition comprises:

(a) from about 20 to 90% by weight, based on the weight of the binder solids, of a film-forming organosilane polymer having a weight average molecular weight of about 500–30,000 comprising (i) from about 30 to 95% by weight, based on the weight of a substantially epoxy free organosilane polymer, of ethylenically unsaturated monomers which do not contain a silane functionality and about 5 to 70% by weight ethylenically unsaturated monomers which contain a silane functionality; and (b) from about 10 to 60%, based on the weight of the binder solids, of particles of a dispersed polymer comprising:

(i) a core comprising a macromolecular polymer which is not highly crosslinked and which has a molecular weight of at least 50,000 and which comprises a variety of different monomers; and (ii) a plurality of macromonomer chains, attached to the macromolecular polymer, having a weight average molecular weight of about 1,000 to 30,0000, comprising 3 to 30% by weight, based on the weight of the macromonomer, of polymerized ethylenically unsaturated monomers which comprise a crosslinking functionality capable of forming a covalent bond with a silane functionality in said organosilane polymer and about 70 to 95% by weight, based on the weight of the macromonomer, of at least one other polymerized ethylenically unsaturated monomer without a crosslinking functionality; and (c) from about 25 to 50% by weight, based on the weight of the composition, of a liquid organic carrier.

The covalent bonding between crosslinking functionalities in said non-aqueous dispersion polymer and silane functionalities in said organosilane polymer is believed to reduce the tendency to cracking, after drying or curing, of the finish produced by coating a substrate with the present composition.

Optionally, the composition may further comprise one or more non-silane film-forming solution polymers, preferably about 0 to 30% more preferably about 0 to 20% by weight, based on the weight of binder solids of the composition.

In a preferred embodiment, the macromonomer chains of the dispersed polymer are covalently bonded at an end portion thereof to the macromolecular polymer. Further, it is preferred that about 5 to 20% of the monomers which comprise the macromonomer chain contain a crosslinking functionality.

The invention also includes a process for coating a substrate with the above coating composition. The claimed invention further includes a substrate having adhered thereto a coating according to the above composition.

The composition of the present invention is especially useful for forming a clear topcoat over a pigmented basecoat. Such a clear topcoat can be applied over a variety of colorcoats, such as water or organic solvent based colorcoats or powder colorcoats.

DETAILED DESCRIPTION OF THE INVENTION

This invention provides a coating composition useful for finishing the exterior of automobile and truck bodies. Depending on its use, the present composition is capable of providing a coating which is durable, has excellent adhesion to basecoats, does not crack, does not deteriorate in terms of transparency under prolonged exposure to weather conditions, and imparts a superior glossy appearance for an extended period. Also, the coating composition offers a significant improvement over conventionally used coating compositions in terms of resistance to etching caused by environmental chemical attack.

A typical automobile steel panel or substrate has several layers of coatings. The substrate is typically first coated with an inorganic rust-proofing zinc or iron phosphate layer over which is provided a primer which can be an electrocoated primer or a repair primer. A typical electrocoated primer typically comprises a cathodically deposited epoxy modified resin. A typical repair primer comprises an alkyd resin. Optionally, a primer surfacer can be applied over the primer coating to provide for better appearance and/or improved adhesion of the basecoat to the primer coat. A pigmented basecoat or colorcoat is next applied over the primer surfacer. A typical basecoat comprises a pigment, which may include metallic flakes in the case of a metallic finish, and polyester or acrylourethane as a film-forming binder. A clear topcoat (clearcoat) is then applied to the pigmented basecoat (colorcoat). The colorcoat and clearcoat are preferably deposited to have thicknesses of about 0.1–2.5 mils and 1.0–3.0 mils, respectively. A composition according to the present invention, depending on the presence of pigments or other conventional components, may be used as a basecoat, clearcoat, or primer. However, a particularly preferred composition is useful as a clear topcoat to prevent environmental chemcical attack to the entire finish. A clearcoat composition of the present invention may be applied over a basecoat composition of the present invention.

The film-forming portion of the present coating composition, comprising polymeric components, is referred to as the "binder" or "binder solids" and is dissolved, emulsified or otherwise dispersed in an organic solvent or liquid carrier. The binder solids generally includes all the normally solid polymeric non-liquid components of the composition. Generally, chemical additives such as stabilizers, catalysts, or pigments are not considered part of the binder solids. Non-binder solids other than pigments usually do not amount to more than about 5% by weight of the composition. In this disclosure, the term binder includes the organosilane polymer, the NAD polymer, and all other optional film-forming polymers. The applied coating composition suitably contains about 50–75% by weight of the binder solids and about 25–50% by weight of the organic solvent carrier.

The binder of the coating composition contains about 20–90%, preferably 40–80%, more preferably about 40% by weight of a film-forming silane containing polymer, hereafter also referred to as the silane polymer. A silane polymer having about 50%, more generally between 50% and 60%, silane monomer has been found to have improved mar and recoat adhesion.

The silane polymer portion of the binder has a weight average molecular weight of about 1000–30,000, a number average molecular weight of about 500–10,000. All molecular weights disclosed herein are determined by gel permeation chromatography using a polystyrene standard, unless stated otherwise.

The silane polymer is the polymerization product of about 30–95%, preferably 40–60%, by weight ethylenically unsaturated non-silane containing monomers and about 5–70%, preferably 40–60%, by weight ethylenically unsaturated silane containing monomers, based on the weight of the organosilane polymer. Suitable ethylenically unsaturated non-silane containing monomers are alkyl acrylates, alkyl methacrylates and any mixtures thereof, where the alkyl groups have 1–12 carbon atoms, preferably 3–8 carbon atoms.

Suitable alkyl methacrylate monomers used to form the organosilane polymer are methyl methacrylate, ethyl methacrylate, propyl methacrylate, butyl methacrylate, isobutyl methacrylate, pentyl methacrylate, hexyl methacrylate, octyl methacrylate, nonyl methacrylate, lauryl methacrylate and the like. Similarly, suitable alkyl acrylate momomers include methyl acrylate, ethyl acrylate, propyl acrylate, butyl acrylate, isobutyl acrylate, pentyl acrylate, hexyl acrylate, octyl acrylate, nonyl acrylate, lauryl acrylate and the like. Cycloaliphatic methacrylates and acrylates also can be used, for example, such as trimethylcyclohlexyl methacrylate, trimethylcyclohexl acrylate, iso-butyl methacrylate, t-butyl cyclohexyl acrylate, or t-butyl cyclohexyl methacrylate. Aryl acrylate and aryl methacrylates also can be used, for example, such as benzyl acrylate and benzyl methacrylate. Of course, mixtures of two or more of the above mentioned monomers are also suitable.

In addition to alkyl acrylates or methacrylates, other polymerizable monomers, up to about 50% by weight of the polymer, can be used in the acrylosilane polymer for the purpose of achieving the desired hardness, appearance, mar resistance and the like. Exemplary of such other monomers are styrene, methyl styrene, acrylamide, acrylonitrile, methacrylonitrile, and the like. Styrene can be used in the range of 0–50% by weight. The silane polymer is substantially epoxy free, preferably essentially free of epoxy groups as crosslinking groups. The disclosed embodiment does not use epoxy groups in the silane polymer.

A suitable silane containing monomer useful in forming the acrylosilane polymer is an alkoxysilane having the following structural formula:

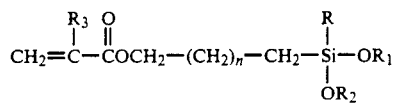

wherein R is either $CH_3$, $CH_3CH_2$, $CH_3O$, or $CH_3CH_2O$; $R_1$ and $R_2$ are $CH_3$ or $CH_3CH_2$; and $R_3$ is either H, $CH_3$, or $CH_3CH_2$; and n is 0 or a positive integer from 1 to 10. Preferably, R is $CH_3O$ or $CH_3CH_2O$ and n is 1.

Typical examples of such alkoxysilanes are the acrylatoalkoxy silanes, such as gamma-acryloxypropyltrimethoxy silane and the methacrylatoalkoxy silanes, such as gamma-methacryloxypropyltrimethoxy silane, and gamma-methacryloxypropyltris(2-methoxyethoxy) silane.

Other suitable alkoxy silane monomers have the following structural formula:

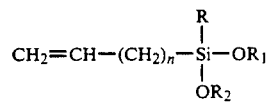

wherein R, $R_1$ and $R_2$ are as described above and n is a positive integer from 1 to 10.

Examples of such alkoxysilanes are the vinylalkoxy silanes, such as vinyl trimethoxy silane, vinyl triethoxy silane and vinyl tris(2-methoxyethoxy)silane.

Other suitable silane containing monomers are ethylenically unsaturated acyloxysilanes, including acrylatoxy silane, methacrylatoxy silane and vinylacetoxy silanes, such as vinylmethyldiacetoxy silane, acrylatopropyltriacetoxy silane, and methacrylatopropyltriacetoxy silane. Of course, mixtures of the above-mentioned silane containing monomers are also suitable.

Consistent with the above mentioned components of the silane polymer, an example of an organosilane polymer useful in the coating composition of this invention may contain the following constituents: about 15-25% by weight styrene, about 30-60% by weight methacryloxypropyltrimethoxy silane, and about 25-50% by weight trimethylcyclohexyl methacrylate.

One preferred acrylosilane polymer consists of about 20% styrene, 55% of a silane monomer such as methacryloxypropyltrimethoxysilane, about 15% methyl methacrylae, about 5% butyl methacrylate, and about 5% ethylhexylacrylate. Another preferred acrylosilane polymer contains about 30% by weight styrene, about 50% by weight methacryloxypropyl trimethoxy silane, and about 20% by weight of nonfunctional acrylates or methacrylates such as trimethylcyclohexyl methacrylate, butyl acrylate, and iso-butyl methacrylate and any mixtures thereof.

Silane functional macromonomers also can be used in forming the silane polymer. These macromonomers are the reaction product of a silane contaning compound, having a reactive group such as epoxide or isocyanate, with an ethylenically unsaturated non-silane containing monomer having a reactive group, typically a hydroxyl or an epoxide group, that is co-reactive with the silane monomer. An example of a useful macromonomer is the reaction product of a hydroxy functional ethylenically unsaturated monomer such as a hydroxyalkyl acrylate or methacrylate having 1-4 carbon atoms in the alkyl group and an isocyanatoalkyl alkoxysilane such as isocyanatopropyl triethoxysilane.

Typical of such above mentioned silane functional macromonomers are those having the following structural formula:

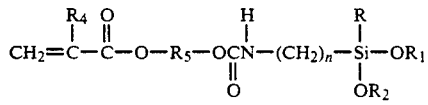

wherein R, $R_1$, and $R_2$ are as described above; $R_4$ is H or $CH_3$, $R_5$ is an alkylene group having 1-8 carbon atoms and n is a positive integer from 1-8.

Additional to the organosilane polymer, other film-forming and/or crosslinking solution polymers may be included in the present application. Examples include conventionally known acrylics, cellulosics, aminoplasts, urethanes, polyesters, epoxides or mixtures thereof.

The silane polymer may optionally contain hydroxy containing monomers, for example, as dislosed in international disclosure no. WO 91/16383 based on International Application No. PCT/JP91/00559, which may improve recoat adhesion. However, in the preferred embodiment, the binder of the coating composition contains about 20-90%, preferably 40-80%, by weight of a film-forming polymeric polyol, that is a separate polymer from the silane polymer. Such a polyol suitably has a weight average molecular weight of about 1500-20,000, preferably 1500-12,000, and a hydroxyl number of about 40-200, preferably 60-140. Suitable polyols include acrylics, polyesters, acrylourethanes, polyester urethanes, polyurethane polyesters, or polyurethanes, polyester urethane silanes, or combinations thereof. Graft polymers of different hydroxy containing resins are also suitable.

A suitable polyol is a polyester or polyesterurethane copolymer thereof having a hydroxy number of about 10 to 200 and a weight average molecular weight of about 6,000-30,000. Such copolymers are well known to those skilled in the art and the particular monomer make-up can be selected to achieve the desired properties for a particular application, for example, depending on whether increased flexibility or increased mar resistance is desired. Especially preferred copolymers are polyester urethanes. Examples of polyesterurethanes are disclosed in U.S. Pat. No. 4,810,759, European Patent Application 0 409 301 A2, European Patent Application 409 300 A, all hereby incorporated by reference.

Examples of polyesters which may be employed in this invention are suitably prepared from linear or branched chain diols, including ether glycols, or mixtures thereof or mixtures of diols and triols, containing up to and including 8 carbon atoms, in combination with a dicarboxylic acid, or anhydride thereof, or a mixture of dicarboxylic acids or anhydrides, which acids or anhydrides contain up to and including 12 carbon atoms, wherein at least 75% by weight, based on the weight of dicarboxylic acid, is an aliphatic dicarboxylic acid. A commericially available conventional polyester, which may be employed in the present composition, is Rucoflex 1015S-120 polyester, having a hydroxy number of 125 and composed of one mole of a glycol, 2 moles of adipic acid, and 2 moles of neopentyl glycol.

Polyester urethanes suitably are a reaction product of a hydroxyl terminated polyester and a polyisocyanate, preferably, an aliphatic or cycloaliphatic diisocyanate.

In the present composition, the polyesters or polyester copolymers such as urethanes have a hydroxyl number of about 10-200 and preferably 40-160 and have a weight average molecular weight of about 6,000-30,000, preferably 9,000-17,000, and a number average molecular weight of about 2,000-5,000, preferably 3,000-4,000. All molecular weights mentioned herein are measured using gel permeation chromatography using polyethyl methacrylate as a standard.

Representative saturated and unsaturated polyols that may be reacted to form a polyester include alkylene glycols such as neoptyl glycol, ethylene glycol, propylene glycol, butane diol, pentane diol, 1,6-hexane diol, 2,2-dimethyl-1,3-dioxolane-4-methanol, 4-cyclohexane dimethanol, 2,2-dimethyl 1,3-propanediol, 2,2-bis(hydroxymethyl)propionic acid, and 3-mercapto-1,2-propane diol. Neopentyl glycol is preferred to form a flexible polyurethane that is soluble in conventional solvents Polyhydric alcohols, having at least three hydroxyl groups, may also be included to introduce branching in the polyester. Typical polyhydric alcohols are trimethylol propane, trimethylol ethane, pentaerythritol, glycerin and the like. Trimethylol propane is preferred, in forming a branched polyester.

The carboxylic acids include the saturated and unsaturated polycarboxylic acids and the derivatives thereof. Aliphatic dicarboxylic acids that can be used to form the polyester are as follows: adipic acid, sebacic acid, succinic acid, azelaic acid, dodecanedioic acid and the like. Prefered dicarboxylic acids are a combination of dodecandioic acid and azelaic acid. Aromatic polycarboxylic acids include phthalic acid, isophthalic acid, terephthalic acid, and the like. Anhydrides may also be used, for example, maleic anhydride, phthalic anhydride, trimellitic anhydride, and the like.

Typical polyisocyanates that may be used to form the polyester urethane are as follows: isophorone diisocyanate which is 3-isocyanatemethyl-3,5,5-trimethylcyclohexyl-isocyanate, propylene-1,2-diisocyanate, butylene-1,2-diisocyanate, butylene-1,3-diisocyanate, hexamethylene diisocyanate, methyl-2,6-diisocyanate, methyl-2,6-diisocyanate caproate, octamethlyene diisocyanate, 2,4,4-trimethylhexamethylene diisocyanate, nonamethylene diisocyante, 2,2,4-trimethylhexamethylene diisocyanate, decamethylene diisocyanate, 2,11-diisocyano-dodecane and the like, meta-phenylene diisocyanate, para-phenylene diisoxyanate, toluene-2,4-diisocyanate, toluene-2,6-diisocyanate, xylene-2, 4-diisocyanate, xylene-2,6-diisocyanate, dialkyl benzene diisocyanates, such as methylpropylbenzene diisocyanate, methylethylbenzene diisocyanate, and the like: 2,2'-biphenylene diisocyanate, 3,3'-biphenylene diisocyanate, 4,4'-biphenylene diisocyanate, 3,3'-dimethyl-4,4'-biphenylene diisocyanate, and the like; methylene-bis(4-phenyl isocyanate), ethylene-bis(4-phenyl isocyanate), isopropylidene-bis(4-phenyl isocyanate), butylene-bis(4-phenylisocyanate), and the like; 2,2'-oxydiphenyl diisocyanate, 3,3'-oxydiphenyl diisocyanate, 4,4'-oxydiphenyl diisocyanate, 2,2'-ketodiphenyl diisocyanate, 3,3'-ketodiphenyl diisocyanate, 4,4'-ketodiphenyl diisocyanate, 2,2'-thiodiphenyl diisocyanate, 3,3'-thiodiphenyl diisocyanate, 4,4'-thiodiphenyl diisocyanate, and the like; 2,2'-sulfonediphenyl diisocyanate, 3,3'-sulfonediphenyl diisocyanate, 4,4'-sulfonediphenyl diisocyanate, and the like; 2,2'-methylene-bis(cyclohexyl isocyanate), 3,3'-methylene-bis(cyclohexyl isocyanate), 4,4'-methylene-bis(cyclohexyl isocyanate), 4,4'-ethylene-bis(cyclohexyl isocyanate), 4,4'-propylene-bis-(cyclohexyl isocyanate), bis(paraisocyano-cyclohexyl)sulfide, bis(para-isocyano-cyclohexyl)sulfone, bis(para-isocyano-cyclohexyl)ether, bis(para-isocyano-cyclohexyl)diethyl silane, bis(para-isocyano-cyclohexyl)diphenyl silane, bis(para-isocyano-cyclohexyl)ethyl phosphine oxide, bis(para-isocyano-cyclohexyl)phenyl phosphine oxide, bis(para-isocyano-cyclohexyl)N-phenyl amine, bis(para-isocyano-cyclohexyl)N-methyl amine, 3,3'-dimethyl-4,4'-diisocyano biphenyl, 3,3'-dimethoxy-biphenylene diisocyanate, 2,4-bis(b-isocyano-t-butyl)toluene, bis(para-b-isocyano-t-butylphenyl)ether, para-bis(2-methyl-4-isocyanophenyl)benzene, 3,3-diisocyano adamantane, 3,3-diisocyano biadamantane, 3,3-diisocyanoethyl-1'-biadamantane, 1,2-bis(3-isocyano-propoxy)ethane, 2,2-dimethyl propylene diisocyanate, 3-methoxy-hexamethylene diisocyanate 2,5-dimethyl heptamethylene diisocyanate, 5-methylnonamethylene diisocyanate, 1,4-diisocyano-cyclohexane, 1,2-diisocyano-octadecane, 2,5-diisocyano-1,3,4-oxadiazole, OCN(CH₂)₃O(CH₂)₂O(CH₂)₃NCO, OCN(CH₂)₃NCO or the following:

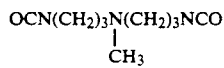

Aliphatic diisocyanates are suitable, forming urethanes that have excellent weatherability. One aliphatic diisocyanate that is particularly preferred is a mixture of 2,2,4-trimethyl hexamethylene diisocyanate and 2,4,4-trimethyl hexamethylene diisocyanate. One cycloaliphatic diisocyanate that may be preferred is 4,4-methylene-bis(cyclohexylisocyanate).

A suitable polyester urethane is the reaction product of trimethylhexamethylene diisocyanate and a hydroxy terminated polyester of neopentyl glycol, trimethylol propane, azelaic acid and dodecanedioic acid. Another suitable polyester urethane is the reaction product of 4,4-methylene-bis(cyclohexyl isocyanate) and a hydroxy terminated polyester of 1,6 hexane diol, cyclohexane diethanol, trimethylol propane and azelaic acid.

A polyester may be prepared by conventional techniques in which the component polyols and carboxylic acids and solvent are esterified at about 110°-250° C. for about 1-10 hours to form a polyester. To form a polyester urethane, a polyisocyanate may then be added and reacted at about 100°-200° C. for about 15 minutes to 2 hours.

In preparing the polyester, an esterification catalyst is typically used. Conventional catalysts include benzyl trimethyl ammonium hydroxide, tetramethyl ammonium chloride, organic tin compounds, such as dibutyl tin diaurate, dibutyl tin oxide stannous octoate and the like, titanium complexes and litharge. About 0.1-4% by weight, based on the total weight of the polyester, of the catalyst is typically used. The aforementioned catalysts may also be used to form the polyester urethane.

The stoichiometry of the polyester preparation is controlled by the final hydroxyl number and by the need to obtain a product of low acid number; an acid number below 10 is preferable. The acid number is defined as the number of milligrams of potassium hydroxide needed to neutralize a 1 gram sample of the polyester. Additional information on the preparation of polyester urethanes is disclosed in the above cited patents incorporated by reference.

Another suitable type of polyol is an acrylic polyol solution polymer, preferably in the amount of about 15% by weight of binder. Such a polyol is suitably the polymerization product of monomers which may include any of the aforementioned alkyl acrylates and/or methacrylates and, in addition, hydroxy alkyl acrylates or methacrylates. This acrylic polyol polymer preferably has a hydroxyl number of about 50-200 and a weight average molecular weight of about 1,000-200,000 and preferably about 1,000-20,000, more preferably about 6000. Preferably the Tg is from 2° to 18° C.

To provide the hydroxy functionality in the acrylic polyol, up to about 90% by weight, preferably 20 to 50%, of the polyol comprises hydroxy functional polymerized monomers. Suitable monomers include hydroxy alkyl acrylates and methacrylates, for example, hydroxy ethyl acrylate, hydroxy propyl acrylate, hydroxy isopropyl acrylate, hydroxy butyl acrylate, hydroxy ethyl methacrylate, hydroxy propyl methacrylate, hydroxy isopropyl methacrylate, hydroxy butyl methacrylate, and the like, and mixtures thereof.

Other polymerizable non-hydroxy containing monomers may be included in the acrylic polyol polymer, in an amount up to about 90% by weight, preferably 50 to 80%. Such polymerizable monomers include, for example, styrene, methylstyrene, acrylamide, acrylonitrile, methacrylonitrile, methacrylamide, methylol methacrylamide and methylol acrylamide and the like, and mixtures thereof.

One example of an acrylic polyol polymer comprises about 10-20% by weight of styrene, 40-60% by weight of alkyl methacrylate or acrylate having 1-6 carbon atoms in the alkyl group, and 10–50% by weight of hydroxy alkyl acrylate or methacrylate having 1–4 carbon atoms in the alkyl group. One such polymer contains about 15% by weight styrene, about 29% by weight iso-butyl methacrylate, about 20% by weight 2-ethylhexyl acrylate, and about 36% by weight hydroxy propylacrylate.

A key component of the coating composition of the present invention is, in addition to the above polymeric components, a dispersed polymer. Polymers dispersed in an organic (substantially non-aqueous) medium have been variously referred to, in the art, as a non-aqueous dispersion (NAD) polymer, a microgel, a non-aqueous latex, or a polymer colloid. See generally, Poehlin et al., editor, SCIENCE AND TECHNOLOGY OF POLYMER COLLOIDS, Volume 1, pages 40–50 (1983); El-Asser, editor, FUTURE DIRECTIONS IN POLYMER COLLOIDS, pages 191–227 (1987); Barrett, DISPERSION POLYMERIZATION IN ORGANIC MEDIA (John Wiley 1975). See also U.S. Pat. Nos. 4,147,688; 4,180,489; 4,075,141; 4,415,681; and 4,591,533, hereby incorporated by reference. Microgel particles, necessarily cross-linked, have been used for years as impact modifiers for plastics, as rheology controllers for coatings, and in basecoats, to permit wet-on-wet application of paints.

In general, the dispersed polymer of the present invention is characterized as a polymer particle dispersed in an organic media, which particle is stabilized by what is known as steric stabilization. According to the prior art, steric stabilization is accomplished by the attachment, commonly by adsorption, of a solvated polymeric or oligomeric layer at the particle medium interface. The problem of providing a steric barrier has been considered in two parts: first, the selection of the soluble polymer which comprises the solvate sheath surrounding each particle and, secondly, the method of attaching or anchoring this polymer to the particle surface. The most widely known type of stabilizer used in dispersed polymers had been based on block or graft copolymers, one component of which is the soluble stabilizing portion and the other portion, often termed the anchor, is insoluble in the continuous phase and is adsorbed on or is absorbed into the disperse phase. It is also known that to increase the stability of the a dispersed polymer, particularly to strong solvents, or to ensure that the stabilizer is not desorbed or displaced, the anchor group may be covalently linked to the particle. This has been achieved by incorporating into the anchor group a reactive group, for example a glycidyl group which can react with a complementary group in the dispersed polymer, for example a carboxylic acid.

In the dispersed polymers of the present composition, the dispersed phase or particle, sheathed by a steric barrier, will be referred to as the "macromolecular polymer" or "core." The stabilizer forming the steric barrier, attached to this core, will be referred to as the "macromonomer chains" or "arms."

The dispersed polymers of the present invention solve the problem of cracking heretofor associated with silane coatings. These dispersed polymers, to reduce cracking to the desired minimum, must be used in higher amounts than dispersed polymers are typically used for other purposes. For example, while microgels have been used in basecoats for flow control at levels of not more than about 5%, the present dispersed polymers are used in an amount varying from about 10 to 60%, preferably about 15 to 40%, most preferably about 20% by weight of the total solids binder in the composition. Hight levels of dispersed polymer may give better crack resistance but may also have an adverse tradeoff regarding appearance. The ratio of the silane polymer component to the dispersed polymer component of the composition suitably ranges from 5:1 to 1:2, preferably 4:1 to 1:1. These relatively high concentrations of dispersed polymers, in the present composition, is made possible by the presence of reactive groups on the arms of the dispersed polymer, which reactive groups make the polymers compatible with the continuous phase of the system.

The dispersed polymer contains about 10–90%, preferably 50–80% by weight, based on the weight of the dispersed polymer, of a high molecular weight core having a weight average molecular weight of at least about 50,000. While a range of 50,000–500,000 is suitable, nominally infinite weight average molecular weights or also suitable. The preferred average particle (core) size is at least 0.1, preferably 0.1 to 0.5 microns. The core preferably is at least 50% by weight of the dispersed polymer, more preferably 60–80% by weight of the dispersed polymer. The arms, attached to the core, make up about 90–10%, preferably 20–50%, most preferably less than 40% by weight of the dispersed polymer, and has a weight average molecular weight of about 1,000–30,000, preferably 1,000–10,000.

Preferably, the macromolecular core of the dispersed polymer is comprised of a variey of different polymerized ethylenically unsaturated monomers. Suitable monomers include styrene, alkyl acrylate or methacrylate, ethylenically unsaturated monocarboxylic acid, and/or silane containing monomomers. Such monomers as methyl methacrylate contribute to a high Tg (transition glass temperature) dispersed polymer, whereas such "softening" monomers as butyl acrylate or 2-ethylhexylacrylate contribute to a low Tg dispersed polymer. Other optional monomers are hydroxyalkyl acrylates or methacrylates or acrylonitrile. It is noted that such functional groups as hydroxy can react with silane groups in the organosilane polymer to produce more bonding in the composition. If the core is crosslinked, allyl acrylate or allyl methacrylate, which crosslink with each other, can be used or an epoxy functional monomer such as glycidyl acrylate or methacrylate can be used, which will react with monocarboxylic acid functional ethylenically unsaturated monomers to crosslink the core.

Preferably, there is silane functionality, for crosslinking purposes, in the case, which functionality may be provided by a small amount of one or more of the silane containing monomers mentioned above with respect to the film forming organosilane polymer. Suitably, the silane functionality is the primary or major means, preferably the sole means, of crosslinking in the core. Suitably about 2 to 10%, preferably about less than 5% of the monomers making up the macromolecular core are silane monomers capable of crosslinking between themselves. Thus, crosslinking occurs by siloxane bonding (—Si—O—Si—). This silane crosslinking enables the core to behave as a non-crosslinked polymer before cure for good flow during application, resulting in improved appearance. The core can crosslink during and after curing, upon exposure to humidity and heat during curing and/or exposure to humidity in the environment after curing. A further advantage of silane being present in the core is that the cured film does not blush when exposed to humidity, which blushing was found to occur without the presence of silane. If the core is pre-crosslinked (before curing) by other means, such as acid/epoxy or diacrylates, then humidity sensitivity may be eliminated but the system may have poor flow and appearance.

The reason that the dispersed polymer in the present coating composition eliminates the cracking problem which silane-containing film forming polymers are otherwise prone is not known for certain. Although not wishing to be bound by theory, one hypothesis is that the dispersed polymer provides high density, high molecular weight reinforcement, which reinforcement is integrated with the matrix of the film. This enables the coating to withstand stress and/or U.V. degradation. Such reinforcement also may prevent the propogation of cracking. Another hypothesis is that the dispersed polymer, with its macromolecular coil or core, provides a certain amount of sponginess and flexibilty to the coating, that is, the macromolecular core may be able to contract and expand, especially with low volatile organic content. This so-called sponginess may compensate to some extent for the points, or concentrated areas, of silane bonding. Silane crosslinking tends to become tightly bound, since each silane moiety or group potentially can be crosslinked at three sites and a number of silane moieties can become extended in a silane ladder or matrix. Without the dispersed polymer, an over concentration of silane crosslinking may result in stress cracking.

As mentioned above, it is preferred that the macromolecular core of the dispersed polymer has a low amount of crosslinking within the macromolecular core and, most preferably, the core has zero pre-crosslinking. This means there is no crosslinking in solution, before the composition is cured or baked. The more the core is crosslinked, the less its sponginess. Also, without crosslinking, the macromolecular core is capable of uncoiling to some extent and therefore has a better tendency to flow, an advantage in spray application of the coating composition. Some degree of crosslinking may be desirable, for example, in order to derive the macromolecular core polymer from shorter chains. However, in general, the greater the crosslinking, the more tightly bound together the polymer and the less its ability to prevent cracking of the coating. Because limited or no pre-crosslinking in the macromolecular core of the dispersed polymer is desired, dispersed polymers which are highly crosslinked, namely star polymers disclosed in U.S. Pat. No. 4,810,756 to Spinelli, would not be equivalent to dispersed polymers of the present invention.

A distinctive feature of the dispersed polymers of the present invention is the presence of macromonomer arms which are reactive, that is these arms have numerous reactive groups, referred to as "crosslinking functionalities," which are adapted to react with the organosilane polymer of the present composition. It is not known with certainty what portion of the these functional groups do, in fact, react with the organosilane polymer, because of the numerous and complicated sets of reactions which may occur during baking and curing of the composition, especially if additional film-forming binders are present. However, it may be said that a substantial portion of these functionalities in the arms, preferably the majority therof, do in actuality react and crosslink with the film-former of the composition, which in some cases may exclusively consist of an organosilane polymer. Of course, if additional film-forming polymers are present, for example, a polyol, then the arms may react with film-formers other than the organosilane polymer. Suitably, about 3 to 30 % of the monomers which make up the macromonomer arms have reactive crosslinking functional groups. Preferably about 10 to 20% of the monomers have such reactive groups. Dispersed polymers having reactive arms have been disclosed in U.S. Pat. No. 4,591,533 to Antonelli et al.

The arms of the dispersed polymer should be anchored securely to the macromolecular core. For this reason, the arms preferably are anchored by covalent bonds. The anchoring must be sufficent to hold the arms to the dispersed polymer after they react with the film-former polymer. For this reason, the conventional method of anchoring by adsorption of the backbone portion of a graft polymer may provide insufficent anchoring.

As indicated above, the arms or macromonomers of the dispersed polymer serve to prevent the core from flocculating by forming what is referred to in the art as a steric barrier. The arms, typically in contrast to the macromolecular core, are believed capable, at least temporarily, of being solvated in the organic solvent carrier or media of the composition. They may therefore be in a chain-extended configuration and their crosslinking functional groups are therefore relatively readily available to reaction with the silane groups of the film forming silane containing polymer. Such arms suitably comprise about 3 to 30%, preferably 10 to 20%, by weight, based on the weight of macromonomer, of polymerized ethylenically unsaturated hydroxy, epoxide, silane, acrylamide (including methacrylanide) acid, anhydride, isocyanate or other crosslinking functionality containing monomers, or combinations thereof, and about 70–95% by weight, based on the weight of the macromonomer, of at least one other polymerized ethylenically unsaturated monomer without such crosslinking functionality. Preferably the crosslinking functionality is a hydroxy, silane or epoxy containing monomer, since such reactive groups can be utilized in one package systems. When the crosslinking functionality is an acid, anhydride or isocyanate, then a two package system, with the dispersed polymer in a first package and the organosilane in a second package, is generally required. Combinations of the above-mentioned crosslinking functional groups are also suitable, although it is noted that hydroxy and silane groups have limited compatibility and are preferably not on the same macromonomer chain.

As an example, the macromonomer arms attached to the core may contain polymerized monomers of alkyl methacrylate, alkyl acrylate, each having 1–12 carbon atoms in the alkyl group, as well as glycidyl acrylate or glycidyl methacrylate or ethylenically unsaturated monocarboxylic acid for anchoring and/or crosslinking. Typically useful hydroxy containing monomers are hydroxy alkyl acrylates or methacrylates as described above.

A preferred composition for a dispersed polymer that has hydroxy functionality comprises a core consisting of about 25% by weight hydroxy ethyl acrylate, about 4% by weight methacrylic acid, about 36.5% by weight methyl methacrylate, about 18% by weight methyl acrylate, about 1.5% by weight glycidyl methacrylate and about 15% styrene. The macromonomer attached to the core contains 97.3% by weight prepolymer and about 2.7% by weight glycidyl methacrylate, the latter for crosslinking or anchoring. A preferred prepolymer contains about 30% by weight butyl methacrylate, about 30% by weight butyl methacrylate, about 30% by weight butyl acrylate, about 10% by weight hydroxyethyl acrylate, about 2% by weight glycidyl methacrylate, and about 15% by weight styrene.

The dispersed polymer may be produced by conventionally known procedures. For example, it has been disclosed that such polymers may be produced by a process of dispersion free radical polymerization of monomers, in an organic solvent, in the presence of a steric stabilizer for the particles. The procedure has been described as basically one of polymerizing the monomers in an inert solvent in which the monomers are soluble but the resulting polymer is not soluble, in the presence of a dissolved amphiteric stabilizing agent. Such procedures have been extensively disclosed in both the patent and non-patent literature, for example, see the above cited references regarding dispersed polymers in general, or U.S. Pat. No. 4,220,679 and PAINT AND SURFACE COATING: THEORY AND PRACTICE, ed. R. Lambourne (Ellis Horwood Limited 1987). As illustrated in the examples below, the macromonomer arms can be prepared by cobalt catalyzed special chain transfer (SCT) polymerization, group transfer polymerization (GTP), or free radical polymerization.

Optionally, the present coating composition may optionally further include, particularly in conjunction with an optional polyol polymer, an additional crosslinking agent, for example conventionally known monomeric or polymeric alkylated melamine formaldehyde resin that is partially or fully alkylated. One preferred crosslinking agent is a methylated and butylated or isobutylated melamine formaldehyde resin that has a degree of polymerization of about 1-3. Generally, this melamine formaldehyde resin contains about 50% butylated groups or isobutylated groups and 50% methylated groups. Such crosslinking agents typically have a number average molecular weight of about 300-600 and a weight average molecular weight of about 500-1500. Examples of commercially available resins are "Cymel" 1168, "Cymel"1161, "Cymel" 1158, "Resimine" 4514 and "Resimine" 354. A preferred melamine, for a good balance of properties, is a fully aklylated resin such as "Cymel 1168." The crosslinking agent is suitably used in the amount of about 5-50% by weight, based on the weight of the binder of the composition. More preferably, the level of melamine is about 15%, about equal to the level of the polyol. Lower levels of melameine may have an advantage with regard to hardness and appearance. Other crosslinking agents are urea formaldehyde, benzoquanamine formaldeyde and blocked polyisocyanates.

Another optional component, in another embodiment of the present invention, is one or more silsesquioxanes. Such silsesquioxanes may suitably be present in the amount of 1 to 15% by weight, based on the weight of the binder, preferably about 10%, to improve the etch resistance when used to provide a coating. Silsesquioxane compounds are oligomers that may be visualized as composed of tetracylosiloxane rings, for example as follows:

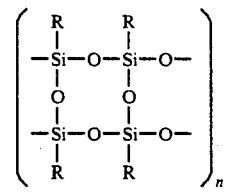

The number of repeating units is suitably 2 or more, preferably 2 to 12. Exemplary compounds, commercially available from Petrarch Systems, Inc. (Bristol, Pa.) include polymethylsilsesquioxane, polyphenylpropylsilsesquioxane, polyphenylsilsesquioxane, and polyphenylvinylsilsesquioxane.

Such silsesquioxanes have a plurality of consecutive $SiO_3R-$ groups, forming SiO cages or "T" structures or ladders. The various rough geometries depend on the n in the above formula, which may vary from 2 to 12 or greater. These silsesquioxane compounds should have at least 1 hydroxy group, preferably at least 4. However, the greater the number of hydroxy groups, the greater the amount of crosslinking. A preferred polysilsesquioxane may be depicted as having the following structural formula:

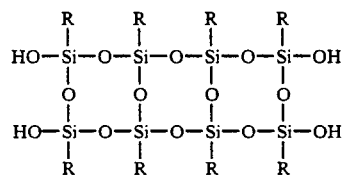

In the above formula, R is a substituted or unsubstituted alkyl, alkoxy or pheny or combination thereof. Substituents include hydroxy, halo groups such as fluoro, and haloalky groups such as trifluoromethyl. As one example, in the above formula, R may consist of about 70 mole percent of phenyl and 30 mole percent propyl. Such a compound is commercially available as Z-6018 from Dow Corning. This compound has a Mw of 1600, 4 SiOH groups, and an OH equivalent weight of 330-360.

A catalyst is typically added to catalyze the crosslinking of the silane moieties of the silane polymer with itself and with other components of the composition, including the dispersed polymer. Typical of such catalysts are dibutyl tin dilaurate, dibutyl tin diacetate, dibutyl tin dioxide, dibutyl tin dioctoate, tin octoate, aluminum titanate, aluminum chelates, zirconium chelate and the like. Tertiary amines and acids or combinations therof are also useful for catayzing silane bonding. Preferably, these catalysts are used in the amount of about 0.1 to 5.0%, more preferbly about 0.6% by weight of the composition. Preferably, when the present composition is used as a clearcoat in a basecoat/clearcoat system, then for improved recoat adhesion, about 0.8% of the catalyst is placed in the basecoat and only about 0.2% of the catalyst is placed in the topcoat. In such a case, the silane catalyst in the basecoat will diffuse to the topcoat.

To improve weatherability of a clear finish produced by the present coating composition, an ultraviolet light stabilizer or a combination of ultraviolet light stabilizers can be added in the amount of about 0.1-5% by weight, based on the weight of the binder. Such stabilizers include ultraviolet light absorbers, screeners, quenchers, and specific hindered amine light stabilizers. Also, an anitoxidant can be added, in the about 0.1–5% by weight, based on the weight of the binder.

Typical ultraviolet light stabilizers that are useful include benzophenones, triazoles, triazines, benzoates, hindered amines and mixtures thereof. A preferred stabilizer package comprises 2% Tin 900 (UV screener) and 1.5% Tin 123 (hindered amine). Specific examples of ultraviolet stabilizers are disclosed in U.S. Pat. No. 4,591,533, the entire disclosure of which is incorporated herein by reference.

For stability, sag resistance, or rheology, the composition may also include other conventional formulation additives such as flow control agents, for example, such as RESIFLOW S (polybutylacrylate), BYK 320 and 325 (high molecular weight polyacrylates); rheology control agents, such as fumed or hydrophobic silica or microgel ; water scavengers such as tetrasilicate, trimethyl orthoformate, triethyl orthoformate and the like.

When the present composition is used as a clearcoat (topcoat) over a pigmented colorcoat (basecoat) to provide a colorcoat/clearcoat finish, small amounts of pigment can be added to the clear coat to eliminate undesirable color in the finish such as yellowing. It may be preferred to have about a 40% level of melamine in the basecoat coupled with about 10% melamine in the clearcoat for improved DOI.

The present composition also can be pigmented and used as the colorcoat, or as a monocoat or even as a primer or primer surfacer. The composition has excellent adhesion to a variety of substrates, such as previously painted substrates, cold rolled steel, phosphatized steel, and steel coated with conventional primers by electrodeposition. The present composition exhibits excellent adhesion to primers, for example, those that comprise crosslinked epoxy polyester and various epoxy resins, as well as alkyd resin repair primers. The present compositon can be used to coat plastic substrates such as polyester reinforced fiberglass, reaction injection-molded urethanes and partially crystalline polyamides.

When the present coating composition is used as a basecoat, typical pigments that can be added to the composition include the following: metallic oxides such as titanium dioxide, zinc oxide, iron oxides of various colors, carbon black, filler pigments such as talc, china clay, barytes, carbonates, silicates and a wide variety of organic colored pigments such as quinacridones, copper phthalocyanines, perylenes, azo pigments, indanthrone blues, carbazoles such as carbozole violet, isoindolinones, isoindolones, thioindigo regs, benzimidazolinones, metallic flake pigments such as aluminum flake and the like.

The pigments can be introduced into the coating composition by first forming a mill base or pigment dispersion with any of the aforementioned polymers used in the coating composition or with another compatable polymer or dispersant by conventional techniques, such as high speed mixing, sand grinding, ball milling, attritor grinding or two roll milling. The mill base is then blended with the other constituents used in the coating composition.

Conventional solvents and diluents are used to disperse and/or dilute the above mentioned polymers to obtain the present coating composition. Typical solvents and diluents include toluene, xylene, butyl acetate, acetone, methyl isobutyl ketone, methyl ethyl ketone, methanol, isopropanol, butanol, hexane, acetone, ethylene glycol, monoethyl ether, VM and P naptha, mineral spirits, heptane and other aliphatic, cycloaliphatic, aromatic hydrocarbons, esters, ethers and ketones and the like.

The coating composition can be applied by conventional techniques such as spraying, electrostatic spraying, dipping, brushing, flowcoating and the like. The preferred techniques are spraying and electrostatic spraying. After application, the composition is typically baked at 100–150° C. for about 15–30 minutes to form a coating about 0.1–3.0 mils thick. When the composition is used as a clearcoat, it is applied over the colorcoat which may be dried to a tack-free state and cured or preferably flash dried for a short period before the clearcoat is applied. The colorcoat/clearcoat finish is then baked as mentioned above to provide a dried and cured finish.

It is customary to apply a clear topcoat over a basecoat by means of a "wet-on-wet" application, i.e., the topcoat is applied to the basecoat without curing or completely drying the basecoat. The coated substrate is then heated for a predetermined time period to allow simultaneous curing of the base and clear coats.

Upon curing of clear topcoat compositions of the present invention, a portion of the silane containing polymer may migrates and stratifies to the top of the clearcoat, particularly when the organosilane polymer is used in combination with a polyol, so as to produce a durable, weather-resistant clearcoat. Such stratification has been shown by electron scanning chemical analysis (ESCA) of a cross section of the cured layer of topcoat.

The coating composition can be formulated as a one-package system that has an extended shelf life.

The following Examples illustrate the invention. All parts and percentages are on a weight basis unless otherwise indicated.

EXAMPLE 1

An organosilane polymer solution A is prepared by charging the following constituents into a polymerization reactor equipped with a heat source and a reflux condensor:

|  | Parts by Weight |
|---|---|
| Portion I |  |
| "Solvesso" 100 | 75.00 |
| Portion II |  |
| Methacryloxypropyltrimethoxy silane | 300.00 |
| Styrene monomer | 173.00 |
| Isobutyl methacrylate monomer | 103.86 |
| "Solvesso" 100 | 45.02 |
| Portion III |  |
| 2,2-(2-methyl butane nitrile) | 57.32 |
| "Solvesso" 100 | 85.80 |
| Total | 840.00 |

The "Solvesso" 100 is a conventional aromatic hydrocarbon solvent. Portion I is charged into the reactor and heated to its reflux temperature. Portion II, containing the monomers for the organosilane polymer, and Portion III, containing the polymerization initiator, are each premixed and then added simultaneously to the reactor while the reaction mixture is held at its reflux temperature. Portion II is added at a uniform rate over a 6 hour period and Portion II is added at a uniform rate over a 7 hour period. After Portion II is added, the reaction mixture is held at its reflux temperature for an additional hour. The resulting acrylosilane polymer solution is cooled at room temperature and filtered.

The resulting acrylosilane polymer solution has a polymer solids content of about 70%, the polymer has a weight average molecular weight of about 3,000, and has the following constituents: 30% styrene, 18% isobutyl methacrylate, and 52% methacryloxypropyl trimethoxysilane.

EXAMPLE 2

A hydroxy functional non-aqueous sterically stabilized dispersed polymer is prepared by charging the following components into a reactor:

|  | Parts by Weight |
|---|---|
| Portion I |  |
| Isopropanol | 179.26 |
| Acrylic polymer solution | 2254.05 |
| (52% solids of an acrylic polymer of 15% styrene, 28% butyl methacrylate, 30% butyl acrylate, 10% hydroxy ethyl acrylate, 2% acrylic acid and 15% ethyl methacrylate having a weight average molecular weight of 10,000 in a solvent mixture of 82.2% xylene and 17.8% butanol) |  |
| Mineral spirits | 255.65 |
| Heptane | 1912.46 |
| Portion II |  |
| Heptane | 28.75 |
| t-Butyl peroctoate | 4.68 |
| Portion III |  |
| Methyl methacrylate monomer | 1459.69 |
| Hydroxyethyl acrylate monomer | 784.81 |
| Styrene monomer | 156.97 |
| Portion IV |  |
| Acrylic polymer solution | 1126.52 |
| (53% solids of an acrylic polymer of 15% styrene, 28% butyl methacrylate, 30% butyl acrylate, 10% hydroxy ethyl acrylate, 2% acrylic acid and 15% ethyl methacrylate, 2.7% glycidyl methacrylate having a weight average molecular weight of 10,000 in a solvent mixture of 82.2% xylene and 17.8% butanol) |  |
| Methyl methacrylate monomer | 125.57 |
| Methyl acrylate monomer | 565.06 |
| Glycidyl methacrylate monomer | 47.05 |
| Heptane | 17.25 |
| Portion V |  |
| Mineral Spirits | 638.63 |
| t-Butyl peroctoate | 47.14 |
| Isobutanol | 127.31 |
| Portion VI |  |
| t-Butyl peroctoate | 30.96 |
| Isobutanol | 255.65 |
| Portion VII |  |
| Heptane | 167.25 |
| Total | 10,184.71 |

Portion I is charged into the reaction vessel and heated to its reflux temperature. Then Portion II is added to the reaction vessel mixed and held at reflux temperature for 2 minutes. Then Portions III and IV are added simultaneously with Portion V, over a 210 minute period, to the reaction vessel while maintaining the resulting reaction mixture at its reflux temperature. Then the mixture is held at its reflux temperature for an additional 45 minutes. Portion VI is added over a 90 minute period while maintaining the reaction mixture at its reflux temperature and then held at this temperature for an additional 90 minutes. Portion VII is added and excess solvent is stripped off to give a 60% solids dispersion.

The resulting polyester dispersed polymer has a core having a weight average molecular weight of about 100,000–200,000 and arms attached to the core having a weight average molecular weight of about 10,000–15,000.

EXAMPLE 3

An acrylic polyol resin solution is prepared by charging the following constituents into a polymerization reactor equipped with a heat source and a reflux condenser:

|  | Parts by Weight |
|---|---|
| Portion I |  |
| n-Pentyl propionate | 501.00 |
| Portion II |  |
| Styrene | 360.00 |
| Isobutyl methacrylate | 696.00 |
| 2-Ethylhexyl acrylate | 480.00 |
| Hydroxypropyl acrylate | 864.00 |
| n-Pentylpropionate | 285.00 |
| Portion III |  |
| t-Butyl peroctoate | 60.00 |
| n-Pentyl propionate | 60.00 |
| Total | 3306.00 |

Portion I is charged into the reactor and is heated to its reflux temperature of about (160–163° C.). Portions II and III are each premixed and then added simultaneously to the reactor while the reaction mixture is held at its reflux temperature. Portion II is added at a uniform rate over a 6 hour period and Portion III is added at a uniform rate over a 7 hour period. After Portion III is added, the reaction mixture is held at its reflux temperature for an additional hour. The resulting acrylic polyol resin solution is cooled at room temperature and filtered.

The resulting acrylic polyol resin solution is 70% by weight of polymer solids. The polymer has a weight average molecular weight of about 6,000 and a hydroxyl number of about 150–160. It consitutes the following: 15% styrene, 29% isobutyl methacrylate, 20% 2-ethylhexyl methacrylate, and 36% hydroxypropyl acrylate.

EXAMPLE 4

A coating composition is prepared by blending together the following constituents:

|  | Parts by Weight |
|---|---|
| Portion I |  |
| Xylene | 163.00 |
| 2(3-hydroxy-3,5'-ditertamylphenyl amylphenyl) benzotriazole | 113.20 |
| Hindered amine U.V. light stabilizer solution (40% solution in xylene of 8-acetyl-3-dodecyl-7,7,9,9-tetramethyl-2,3,8-triazaspiro (4,5)-decane-2,4 dione) | 147.80 |
| Baysilon Oil Solution (72.8 parts Baysilone Fluid OL and 655.2 parts xylene) | 4.10 |
| Portion II |  |
| Methylated/butylated melamine formaldehyde resin (fully butylated and methylated melamine formaldehyde | 2068.50 |

|  | Parts by Weight |
|---|---|
| resin having a butoxy/methoxy ratio of 1:1 and a degree of polymerization of about 1-1.2) | |
| Acrylic polyol resin solution | 4054.30 |
| Blocked sulfonic acid solution (33% solids in methanol of dodecyl benzene sulfonic acid blocked with dimethyl oxazolidine, molar ratio of acid: dimethyl oxazolidine is 1.52:1) | 236.40 |
| Dispersed polymer (prepared above) | 985.40 |
| Acrylosilane polymer solution A (prepared above) | 3439.00 |
| Dibutyl tin dilaurate | 65.00 |
| Portion III | |
| Methanol | 203.80 |
| "Solvesso" 100 - hydrocarbon solvent | 458.50 |
| Total | 11,939.00 |

The constituents of Portion I are added in the order shown to a mixing vessel and agitated until solution is complete. Portion II is added to the vessel and mixed for 30 minutes. Portion III is added and mixed for 30 minutes. The resulting clear coating composition has 70% solids content.

The resulting composition is sprayed onto primer coated phosphatized steel panels that were coated with a solvent base pigmented acrylic polymer basecoating composition. The composition is sprayed onto the panels before the basecoating is baked. The panels are baked at 120° C. for 30 minutes and a clear coat about 2 mils thick is formed on each panel. The clear coating has a hardness of 8 knoops, a gloss measured at 20° C. of 95. The coating has excellent outdoor weatherability and resistance to environmental attack, good mar and scratch resistance, good humidity resistance as determined by the Cleveland Humidity test and good chip resistance as determined by a gravelometer test.

EXAMPLE 5

An acrylosilane polymer solution B is prepared by first forming a silane contaning macromonomer and then reacting the macromonomer with acrylic monomers.

The macromonomer is prepared by charging the following constituents into a reactor equipped as above:

|  | Parts by Weight |
|---|---|
| Portion I | |
| Y-9030 (isocyanatopropylmethoxy silane) | 750.0 |
| Xylene | 300.0 |
| Portion II | |
| Hydroxyethyl acrylate monomer | 340.0 |
| Total | 1390.0 |

Portion I is heated to about 120° C. and Portion II is slowly added over a 1 hour period with constant mixing. The reaction mixture is held at the above temperature for about 1 hour and the isocyanate level is checked by infrared analysis. When the isocyanate level reaches zero, the reaction is stopped and the resulting macromonomer solution is cooled to room temperature.

Acrylosilane polymer solution B is prepared by charging the following constituents into a reactor as equipped above:

|  | Parts by Weight |
|---|---|
| Portion I | |
| "Solvesso" 100 | 430.0 |
| Portion II | |
| Macromonomer solution (prepared above) | 1826.0 |
| Styrene monomer | 765.0 |
| Methyl methacrylate monomer | 153.0 |
| Butyl methacrylate monomer | 153.0 |
| 2-Ethylhexyl methacrylate monomer | 153.0 |
| "Solvesso" 100 | 170.0 |
| Portion III | |
| 2,2-(2 methyl butane nitrile) | 100.0 |
| "Solvesso" 100 | 300.0 |
| Total | 4050.0 |

Portion I is charged into the reactor and heated to its reflux temperature. Portions II and III are premixed and slowly added to the reactor while maintaining the reaction mixture at its reflux temperature. Portion II is a added over a 6 hour period and Portion III is added over a 7 hour period. The reaction mixture is held at its reflux temperature for an additional hour and then cooled to room temperature.

The resulting acrylosilane polymer solution has a polymer solids content of about 66%. The polymer has a weight average molecular weight of about 6,000, and has the following constituents: 53% macromonomer, 29% styrene, 6% methyl methacrylate, 6% butyl methacrylate, and 6% 2-ethylhexyl methacrylate.

EXAMPLE 6

An acrylosilane polymer solution C is prepared by cobalt special chain transfer (SCT) by charging the following constituents into a heated reactor flask of five liter volume fitted with a water cooled condensor, stirrer, 2 feed metering pumps and a thermometer:

|  | Parts by Weight |
|---|---|
| Portion I | |
| "Solvesso" 100 | 120.0 |
| Ethylene Glycol Monobutyl Ether Acetate | 120.0 |
| Xylene | 150.0 |
| Portion II | |
| gamma-methacryloxypropyltrimethoxy silane | 39.67 |
| Styrene | 28.33 |
| Isobutyl methacrylate | 45.33 |
| Co(DMG-BF$_2$)$_2$ | 0.05 |
| VAZO 67 | 2.74 |
| Portion III | |
| gamma-methacryloxypropyltrimethoxy silane | 847.83 |
| Styrene | 605.42 |
| Isobutyl methacrylate | 968.67 |
| Portion IV | |
| VAZO 67 | 17.25 |
| "Solvesso" | 100.00 |
| Ethylene glycol monobutyl ether acetate | 100.00 |
| Xylene | 100.00 |
| Portion V | |
| t-Butyl Peroxyacetate | 10.00 |
| Xylene | 60.00 |

Portion I, containing organic solvents, is charged into the reactor flask and heated under a nitrogen atmosphere to its reflux temperature. Portion II, containing the acrylosilane monomers and an initiator (a cobalt chelate of dimethylglycol and boron difluoride), is added to the refluxing solvent over a 10 minute period. After the 10 minute period, Portion III, containing additional monomers, and Portion IV, containing additional solvent, are each premixed and then added simultaneously to the reactor while the reaction mixture is held at its reflux temperature. Portion III is added at a uniform rate over a period of 360 minutes and Portion IV is added at a uniform rate over a period of 390 minutes. Then, Portion V, containing an initiator to kill the cobalt chain transfer, is fed over a 20 minute period. After Portion V is added, the reaction mixture is held at its reflux temperature for an additional 30 minutes. The resulting acrylosilane polymer solution is cooled at room temperature and filtered. The polymer has a weight average molecular weight of about 10,000-12,000 and constitutes 29% styrene, 30% isobutyl methacrylate and 41% methacryloxypropyltrimethoxy silane.

EXAMPLE 7

An acrylosilane polymer solution D is prepared by a group transfer process (GTP) as follows. To a four neck 3 liter flask, fitted with a stirrer, condenser, two feed pumps, thermometer and nitrogen inlet is added 950 g toluene, 136 g methyl methacrylate, 106 g butyl methacrylate, 118 g trimethoxysilylpropyl methacrylate and 46.2 g trimethoxysilylpropyl dimethyl ketene. The reaction mixture is cooled to 5° C. and 4 ml of tetrabutyl ammonium m-chlorobenzoate catalyst is added over 90 minutes. The catalyst feed is temporarily interrupted during the reaction exotherm. When the exotherm subsides, the catalyst feed is resumed together with a monomer feed, over 40 minutes, of 220 g methyl methacrylate, 212 g butyl methacrylate and 237 g trimethoxysilylpropyl methacrylate . After completing all the addition, the reaction mixture is held for an additional half hour, after which 45 g methanol, for killing the ketene initiator, is added to the reaction mixture. The resulting polymer solution constitutes 35% methyl methacrylate, 31% butyl methacrylate, and 34% methacryloxypropyl trimethoxy silane.

EXAMPLE 8

The following components are used in preparing an acrylosilane solution polymer by free radical polymerization.

|  | Parts by Weight |
|---|---|
| Portion I |  |
| "Solvesso" 100 | 726.4 g |
| Portion II |  |
| Methacryloxypropyltrimethoxy silane | 1380.3 g |
| Styrene | 500. g |
| Methyl methacrylate monomer | 424.7 g |
| 2-Ethylhexyl acrylate | 159.2 g |
| Butyl methacrylate monomer | 159.2 g |
| Hydrocarbon ("Napoleum" 145A) | 81.8 g |
| Portion III |  |
| "Lupersol" 70 | 70. g |
| Hydrocarbon ("Napoleum" 145A) | 199.3 g |
| Portion IV |  |
| Hydrocarbon ("Napoleum" 145A) | 27.2 g |
| Portion V |  |
| Hydrocarbon ("Napoleum" 145A) | 9.1 g |

Portion I, containing organic solvent, is charged to the reaction flask and heated to reflux. Portion II, containing the monomers for the acrylosilane polymer, and Portion III, containing a t-butyl peroxyacetate initiator, are added simultaneously. Portion II is added over a 6 hour period, and Portion III is added over a 7 hour period. After Portion II is added, Portion IV is added immediately. After Portion III is added, Portion V is added immediately. Heating is continued at reflux for one additional hour after all the portions have been added. The reaction mixture is then cooled and filtered.

EXAMPLE 9

A dispersed (NAD) polymer A is prepared as follows. The macromonomer portion is prepared by a group transfer procedure.

Macromonomer A: To a four neck 3 liter flask, is fitted a stirrer, condenser, two feed pumps, thermometer and nitrogen inlet. To the flask is added 840 g of toluene, 100.3 g 2-ethylhexyl methacrylate, 75.4 g isobutyl methacrylate, 16.4 g hydroxyethyl methacrylate and 38.6 g trimethoxysilylpropyl dimethylketene. The reaction mixture is cooled to 5° C. and the addition of 6.0 g tetrabutylammonium m-chlorobenzoate catalyst over 90 minutes is started. The catalyst feed is temporarily interrupted during the reaction exotherm. When the exotherm subsides, the catalyst feed is resumed together with a monomer feed over 40 minutes, comprising 202.1 g 2-ethylhexyl methacrylate, 136.7 g isobutyl methacrylate and 29.7 g hydroxyethyl methacrylate. A second monomer feed of 23.0 g allyl methacrylate is then added to the reactor. After completing all the additions, the reaction mixture is held for an additional 30 min., after which 3.0 g methanol is added to the reaction mixture.

Macromolecular Core: A reactor is charged with 248.3 g of macromonomer A above and 251.94 g heptane and heated to reflux under $N_2$. At reflux is added 0.41 g tert-butylperoctoate, an initiator, followed with monomer and initiator feeds added over 210 minutes. The monomer feed is as follows: 20.6 heptane, 41.58 g stryrene, 54.25 g Methyl acrylate, 138.61 g methyl methacrylate, 13.86 g methacryloxypropyl trimethoxysilane, 27.12 g acrylonitrile, 133.7 g macromonomer A. The initiator feed is as follows: 48.38 g heptane and 4.16 g TBPO (tertiary butyl peroxide). The reaction is held at reflux for 45 minutes. A scavenger mix of 18.04 g heptane and 2.72 g TBPO is then added over 90 minutes. The reaction is held at reflux for 60 minutes and then distilled t 55% solids.

EXAMPLE 10

This example illustrates a dispersed or NAD Polymer B, in which the macromonomer is prepared by special chain transfer :

Macromonomer B: To a reactor is added 100.92 g butyl acrylate, 100.92 g isobutyl methacrylate, 600.62 g 2-ethylhexyl methacrylate , 110.24 g hydroxyethyl methacrylate and 611.94 g toluene. The mixture is heated to reflux under $N_2$. At reflux is added a mixture of 178.43 g butyl acrylate, 178.45 g isobutylmethacrylate, 42.93 g toluene, 1.17 g VAZO 88 (a nitrile initiator) and 30 ppm Co(DMG-BF2)2 catalyst over 10 minutes. To the reactor is then fed a mixture of 190.61 g isobutylmethacrylate, 621.93 g 2-ethylhexyl methacrylate, 120.66 g methacryloxypropyl trimethoxysilane, 4.13 g VAZO 88 and 86.08 g toluene over a period of 240 minutes. This is followed with a scavenger feed of 108.01 g toluene and 2.01 g VAZO 88 for 60 minutes. The reaction is the held at reflux for 90 minutes. Finally, 251.21 g toluene is added.

Macromolecular Core: To a reactor is charged 142.4 g of macromonomer B as prepared above and 251.94 g heptane. This is heated to reflux under $N_2$. At reflux is added 0.41 g tert-butylperoctoate, followed with monomer and initiator feeds added over 210 minutes. The monomer feed is as follows: 20.6 g heptane, 41.58 g styrene, 54.25 g methyl methacrylate, 138.61 g methyl acrylate, 13.86 g methaacryloxypropyl trimethoxysilane, 27.12 g acrylonitrile, 76.68 g of macromonomer B. The initiator feed is as follows: 48.38 g heptane and 4.16 g TBPO. The reaction feed is held at reflux for 45 minutes and then a scavenger mix is started of 18.04 g heptane and 2.72 g TBPO over 90 minutes. The reaction mixture is held at reflux for 60 minutes and distilled to 55% solids.

EXAMPLE 11

This example illustrates a dispersed (NAD) Polymer C prepared by a free radical procedure:

Macromonomer C: To a reactor is added 195.91 g xylene which is heated to reflux under $N_2$. At reflux is added a mixture of 213.0 g butylmethacrylate, 221.21 g butyl acrylate, 49.54 g hydroxyethyl acrylate, 11.6 g methyl methacrylate, and 6.0 g xylene over 240 mins. with the initiator feed. The initiator feed consists of 30.0 g xylene, 41.55 g butanol and 37.18 g TBPO and is fed to the reactor with monomer feed over 270 mins. To the reactor is added a mix of 0.02 g butyl catechol, 0.21 g isopropanol, 8.8 g glycidyl methacrylate and 3.0 g xylene. A mix of 0.12 g dimethylethylamine and 0.5 g xylene is added to the reactor, held for 90 mins. and cooled quickly to below 176° F.

Macromolecular core C: To a reactor is charged 142.4 g macromonomer C prepared as above and 251.94 g heptane. The mixture is heated to reflux under $N_2$. At reflux is added 0.41 g tert-butylperoctoate, followed with monomer and initiator feeds added over 210 minutes. The monomer feed consists of the following: 20.6 g heptane, 41.58 g styrene, 68.11 g methyl methyl methacrylate, 138.61 g methyl acrylate, 27.12 g acrylonitrile, and 76.68 g of macromonomer C as prepared above. The initiator feed consisted of the following: 48.38 g heptane and 4.16 g TBPO. The reaction is held at reflux for 45 minutes and then is added a scavenger mix of 18.04 g heptane and 2.72 g TBPO over 90 minutes. The reaction is held at reflux for 60 minutes and then distilled to 55% solids.

EXAMPLE 12

This example illustrates a clearcoat composition according to the present invention. The following ingredients were added with mixing and a nitrogen blanket:

| | | |
|---|---|---|
| Polymer B | 320.00 | gm |
| NAD A | 162.00 | gm |
| Tin 1130 | 7.50 | gm |
| Tin 440 (40% sol. in Xylene) | 7.50 | gm |
| "Byk" 325 | 0.60 | gm |
| Trimethyl orthoformate | 1.00 | gm |
| "Fascat" 4020 | 6.00 | gm |
| "Solvesso" 100 | 35.00 | gm |

In the above list, tin 1130 and tin 440 are U.V. screeners, "Byk" 325 is a flow agent, trimethylorthoformate is a stabilizer to prevent gelling, "Fascat" 4020 is a disbutyl tin dilaurate curing catalyst, and "Solvesso" 100 is an aromatic solvent. The clearcoat composition is sprayed at a viscosity of 35" Fisher #2 cup. It is sprayed over clearcoat wet on wet at 1.8-2.0 mil thickness and baked 30 min. at 265° F. The clearcoat typically exhibits an out of oven hardness of 3-4 Knoop, a gloss of 85-95 at 20° and a DOI of 80-90. The clearcoat had excellent durability and crack resistance.

The above examples of dispersed polymers illustrate the presparation of dispersed polymers with hydroxy functionalities in the macromonomer arms attached to the core. Analogous dispersed polymers may be prepared analogously, with epoxide, anhydride, isocyanate, silane, or amine functionalities in the macromonomers, respectively, by the substitution, as will be appreciated by those skilled in the art, of the hydroxy-containing monomer in the above example, with a corresponding amount, respectively of an epoxide-containing monomer such as glycidyl methacrylate, an anhydride-containing monomer such as itaconic anhydride, an isocyanate containing monomer such as benzene, 1-(1-isocyanto-1-methylethyl)-3-(1-methylethenyl) a,a-Dimethyl meta-isopropenyl benzly isocyanate ("TMI" metal vinyl isocyanate available from American Cyanamid in Wayne, N.J.), a silane-containing monomer such as gamma-methacryloxypropyltrimethoxy silane, or an amide or amine-containing monomer such as methacrylamide.

Various modifications, alterations, additions, or substitutions of the components of the composition and process of this invention will be apparent to those skilled in the art without departing from the scope and spirit of this invention and it should be understood that this invention is not unduly limited to the illustrative embodiments set forth herein.

What is claimed is:

1. A composition useful for coating a substrate, which composition comprises:
   (a) from about 20 to 90% by weight, based on the weight of the binder solids, of a film-forming essentially epoxy-free alkoxysilane-functional polymer having a weight average molecular weight of about 500-30,000 comprising from about 30 to 95% by weight, based on the weight of the alkoxysilane-functional polymer, of ethylenically unsaturated monomers which do not contain an alkoxysilane functionality and about 5 to 70% by weight ethylenically unsaturated monomers which contain an alkoxysilane functionality; and
   (b) from about 10 to 60%, based on the weight of the binder solids, of a dispersed polymer having an average particle size of at least about 0.1 micron, comprising:
      (i) a core comprising a macromolecular polymer; and
      (ii) a plurality of macromonomer chains, attached to the macromolecular core, having a weight average molecular weight of about 1,000 to 30,000, comprising 3 to 30% by weight, based on the weight of the macromonomer, of polymerized ethylenically unsaturated monomers which comprise a crosslinking functionality capable of forming a covalent bond with an alkoxysilane functionality in said alkoxysilane-functional polymer and about 70 to 95% by weight, based on the weight of the macromonomer, of at least one other polymerized ethylenically unsaturated monomer without a crosslinking functionality; and (c) from about 25 to 50% by weight, based on the weight of the composition, of a liquid organic carrier.

2. The composition of claim 1, wherein the ratio by weight of alkoxysilane-functional polymer to the dispersed polymer ranges from 5:1 to 1:1.

3. The composition of claim 1, wherein 10 to 20% of the monomers which comprise the macromonomer chains contain a crosslinking functionality.

4. The composition of claim 1, wherein the concentration of said dispersed polymer is about 10 to 60% by weight of binder.

5. The composition of claim 1, wherein about 2 to 10 percent of the monomers which comprise the macromolecular polymer crosslink within the core.

6. The composition of claim 1, wherein less than 5 percent of the monomers which comprise the macromolecular polymer crosslink within the core.

7. The coating composition of claim 1, wherein the crosslinking functionality in the dispersed polymer are selected from the group comprising hydroxy, epoxide, silane, anhydride, acrylamide, carboxylic and cyanate moieties.

8. The coating composition of claim 1, wherein the crosslinking functionality in the dispersed polymer are selected from the group consisting of hydroxy, epoxide, and silane.

9. The coating composition of claim 1, wherein the film-forming alkoxysilane-functional polymer may also comprise hydroxy functional groups.

10. The coating composition of claim 1, wherein the composition further comprises a polyol.

11. The coating composition of claim 1, further comprising a crosslinking agent.

12. The coating composition of claim 11, wherein the crosslinking agent is an alkylated melamine formaldehyde.

13. The coating composition of claim 1, wherein the the alkoxysilane-functional polymer is an acrylosilane polymer.

14. The coating composition of claim 1, wherein the ethylenically unsaturated monomers which contain a alkoxysilane functionality have the following structural formula:

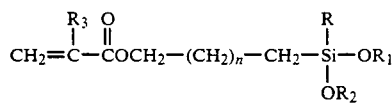

wherein R is selected from the group consisting of CH$_3$, CH$_3$CH$_2$, CH$_3$O, and CH$_3$CH$_2$O; R$_1$ and R$_2$ are individually selected from the group consisting of CH$_3$ and CH$_3$CH$_2$; and R$_3$ is selected from the group consisting of H, CH$_3$, or CH$_3$CH$_2$ and n is 0 and a positive integer of not greater than 8.

15. The coating composition of claim 1, wherein the alkoxysilane-functional polymer consists essentially, in polymerized form, of about 15-25% by weight of a styrene, about 25-50% by weight of a methacrylate and/or acrylate, and about 30-60% by weight of trimethoxysilane-containing monomer.

16. The coating composition of claim 1, wherein
(a) the core of the dispersed polymer comprises polymerized monomers of styrene, an alkyl methacrylate, an ethylenically unsaturated monocarboxylic acid; and
(b) the macromonomers attached to the core comprise polymerized alkyl methacrylate, alkyl acrylate monomers, or mixtures thereof, each having 1-12 carbon atoms in the alkyl group, hydroxy alkyl acrylate or hydroxy alkyl methacrylate monomers, or mixtures thereof, each having 1-4 carbon atoms in the alkyl group, and glycidyl acrylate or glycidyl methacrylate.

17. The coating composition of claim 1, wherein the composition contains about 0.1-5% by weight, based on the weight of the composition, of an organo tin catalyst, an aluminum catalyst or a zirconium catalyst.

18. A process for coating a substrate, comprising the steps of:
(a) applying a layer of a pigmented basecoating to the substrate to form a basecoat thereon;
(b) applying to the basecoat a layer of the composition of claim 1 to form a top coat over said basecoat;
(c) curing the basecoat and topcoat to form a basecoat and topcoat on the substrate.

19. A substrate coated with a composition of claim 1.

20. A substrate coated with a pigmented basecoat of a film forming polymer and a pigment, and a clearcoat comprising the composition of claim 1 in superimposed adherence to the basecoat.

21. The composition of claim 1, wherein the dispersed polymer comprises 50-90%, by weight of dispersed polymer, of said macromolecular core, and 10-50%, by weight of the dispersed polymer, of said macromonomer chains.

22. The composition of claim 1, wherein the core is not highly crosslinked and comprises polymerized monomers of an alkyl methacrylate or alkyl acrylate having 1-8 carbon atoms in the alkyl group.

23. The composition of claim 1, wherein the composition is a one-package system and comprises an effective amount of a water scavenger.

24. The composition of claim claim 23, wherein the water scavenger is trimethyl orthoformate or triethyl orthoformate.

25. The composition of claim 1, wherein the average particle size is 0.1 to 0.5 microns.

26. The composition of claim 1, wherein the composition is an etch resistant clearcoat forming composition.

* * * * *